United States Patent [19]

Fischer et al.

[11] 4,018,969

[45] Apr. 19, 1977

[54] ELECTROCHEMICAL STORAGE CELL

[75] Inventors: Wilfried Fischer, Neckargemund; Herbert Kleinschmager, Eppelheim; Wilheim Haar, Sandhausen; Gert Weddigen, Hd-Neuenheim; Franz-Josef Rohr, Absteinach, all of Germany

[73] Assignee: Brown, Boveri & Cie. A.G., Mannheim, Germany

[22] Filed: Mar. 26, 1976

[21] Appl. No.: 670,864

[30] Foreign Application Priority Data

Mar. 27, 1975 Germany .......................... 2513651

[52] U.S. Cl. ............................... 429/104; 429/191; 429/194

[51] Int. Cl.² .................................. H01M 10/00

[58] Field of Search .......... 429/104, 105, 101, 102, 429/218, 191, 30, 33, 194, 197

[56] References Cited

UNITED STATES PATENTS

| 3,607,417 | 9/1971 | McRae et al. ..................... 429/29 |
| 3,730,771 | 5/1973 | Tannenberger et al. .......... 429/194 |
| 3,817,790 | 6/1974 | Mitoff ................................ 429/105 |
| 3,870,561 | 3/1975 | Charbonnier et al. ............ 429/102 |
| 3,935,025 | 1/1976 | Cadman et al. ................... 429/101 |
| 3,953,231 | 4/1976 | Farrington et al. ............ 429/218 X |
| 3,953,233 | 4/1976 | Roth et al. .................... 429/218 X |

*Primary Examiner*—John H. Mack
*Assistant Examiner*—C. F. Lefevour
*Attorney, Agent, or Firm*—Herbert L. Lerner

[57] ABSTRACT

An electrochemical storage cell or battery based on alkali metal and sulfur with at least one anode chamber containing alkali metal and one cathode chamber containing sulfur-alkali compounds separated from each other by an ion-conducting solid electrolyte wherein the sulfur-alkali compounds are at least partially dissolved in an organic liquid solvent with a boiling point above the operating temperature of the cell, the operating temperature being in the range of about 100° to 200 C. The solvent permits lower operating temperature with reduced rate of corrosion.

12 Claims, 5 Drawing Figures

ELECTROCHEMICAL STORAGE CELL

This invention relates to an electrochemical cell and more particularly refers to a new and improved electrochemical storage cell or battery based on alkali metal and sulfur with at least one anode and one cathode chamber which are separated from each other by an ion-conducting solid electrolyte.

Electrochemical cells employing alkali metal and sulfur are known in the art. The operating temperature of such alkali metal/sulfur cells has up to now been at 300° to 350° C. One reason therefor is that at this temperature the conductivity of the solid alkali ion-conducting electrolyte is substantially higher than at lower temperatures. The other reason is that sulfur or alkali polysulfide is used as the cathodic reaction partner, which must be present in the molten state. The usually employed sodium polysulfides have melting points of between 242° and 1200° C. It is now important in the technical realization of such cells to let the reaction during the discharge proceed down to polysulfides as low, i.e., as alkali-rich as possible, as then the capacity and the energy density become particularly high. However, the melting point increases substantially with the alkali content and therewith, the necessary operating temperature. This leads ultimately to serious corrosion problems.

A compromise between these contradictory requirements has heretofore been to choose a cell operating temperature of 300° to 350° C. Then, the discharge reaction, if sodium is used, can proceed to about $Na_2S_3$ (more accurately, according to the phase diagram, to $Na_2S_{2.8}$). This corresponds to a theoretical energy density of 760 Wh/kg. If the cell is discharged further, the reaction products $Na_2S_2$ and $Na_2S$ are generated, which are solid at 300° to 350° C. If solid reaction products are present, the kinetics becomes so poor that the cell can then not be charged any longer or only with a very small energy density, so that the higher, theoretically possible energy densities ($Na_2S$ corresponds to 1260 Wh/kg) cannot be attained.

An object of the present invention is to provide an electrochemical cell based on alkali metal and sulfur wherein the gross reaction proceeds up to the monosulfide, so that the energy density becomes as high as possible; and the operating temperature maintained as low as possible so that the rate of corrosion becomes as small as possible.

With the foregoing and other objects in view, there is provided, in accordance with the invention, in an electrochemical storage cell or battery based on alkali metal and sulfur with at least one anode chamber containing alkali metal and one cathode chamber containing sulfur-alkali compounds which are separated from each other by an ion-conducting solid electrolyte, the improvement comprising at least partially dissolving the sulfur-alkali compounds in the cathode chamber, in an organic liquid solvent with a boiling point above the operating temperature of the electrochemical storage cell, said operating temperature of the cell being in the range of about 100° to 200° C.

The solvent may be a single solvent or a mixture of several solvents. Preferably the solvent is a proton-free solvent, i.e. the solvent is not a proton donor. Acid solvents are known proton donor solvents whereas non-proton donor solvents include base solvents known as proton acceptor solvents and aprotic solvents which acts neither as an acid nor a base and does not yield or accept a proton.

The preferred class of compounds for use as solvents are the polyhydroxyalcohols, more particularly aliphatic alcohols having 2-8 carbon atoms with 2-4 hydroxyl groups, preferably the glycols having 2 hydroxyl groups. Thioalcohols corresponding to the polyhydroxy alcohols are also desired. The preferred specific polyhydroxy alcohol solvents are ethylene glycol and glycerin.

Thus, in a storage cell of the above-mentioned type, difficulties involved in operating at a lower temperature and minimizing corrosion were obviated, according to the invention, by providing that there is in the cathode chamber, for the purpose of at least partially dissolving the sulfur-alkali compounds, an organic, preferably proton-free solvent or a mixture of several solvents with a boiling point above the operating temperature, and that the operating temperature of the cell is in the range of about 100° to 200° C. The boiling point of the solvents at atmospheric pressure, i.e. 760 mm, will range from 100° to 500° C or higher, preferably from about 150° to 350° C. The molecular weight of the solvents will generally range from about 50 to 250, preferably from 60 to 100. The amount of $Na_2S_4$ dissolved in the solvents at operating temperatures will generally range from about 100 to 500 and higher, grams per liter.

The reaction can proceed further, through the presence of a solvent, in the direction toward the more alkali-rich sulfides, the high melting point of which is no longer the bottleneck, as the sulfides are present at least partially in solution and the alkali metal is present in ion form, whereby sufficient reaction kinetics is ensured.

Numerous solvents were investigated. Polyhydroxy alcohols or thioalcohols, particularly glycol and glycerin were found particularly well suited in the practice of the invention. High conductivity was further obtained with dimethyl sulfoxide and diethylene triamine. The solubility of $Na_2S$ and $Na_2S_4$ in these and other solvents will be found in Table 1.

Table 1:

| Solubility of $Na_2S_x$ in Glycol and Other Solvents | | |
|---|---|---|
| Temperature °C  Solvent | Dissolved Substance | Amount Dissolved g/l |
| 166  Ethylene glycol | $Na_2S_4$ | 583.9 |
| 170  Ethylene glycol | $Na_2S$ | 175.0 |
| 55   Ethanol | $Na_2S_4$ | 108.0 |
| 140  Phenol | $Na_2S_4$ | 27.0 |

The electric conductivities of saturated solutions of solvents are measured at different temperatures and tabulated in Table 2.

Table 2:

| Resistivity ρ of Saturated Solutions of $Na_2S_4$ and $Na_2S$. | | | | | | |
|---|---|---|---|---|---|---|
| Solvent | Dissolved Substance | ρ (ohm-cm) | | | | |
|  |  | 90° | 110° | 130° | 150° | 170° |
| Ethylene glycol | $Na_2S_4$ | 58,8 | 35,5 | 22,9 | 14,8 | 10,9 |
| Triethanolamine | " | 67,6 | 36,3 | 21,7 | 14,0 | 77,6 |
| Furfuryl alcohol | " | 216 | 166 | 137 | 105 | X |
| Dimethyl formamide | " | 65,3 | 48,0 | 36,8 | 28,8 | X |
| Ethylene glycol | $Na_2S$ | 26,9 | 19,9 | 14,0 | 10,6 | 8,6 |

From Table 2, it will be seen that the solvents used for this measurement are satisfactory for the purpose of the invention. However, other solvents, particularly various mixtures of solvents, within the scope of the present invention may also be employed.

It is normally not necessary to provide an amount of solvent in the cathode chamber so that the entire body of polysulfides or sulfur is dissolved, as the rate of dissolution with the solvents in question is as a rule higher than the speed of the electrochemical transport reaction.

This fact is favorable inasmuch as with excessively high solvent contents, the energy density would drop in an undesirable manner.

However, sufficient solvent must be present so that the solvent remains in contact with the solid electrolyte over an area as large as possible, which may be made to be based on capillary activity, in order to ensure the necessary mass transport. Measurements have shown that the polysulfides in undissolved state in the cathode chamber may be up to 75% by weight and possibly more. A typical operating range is characterized by a weight ratio of solvent to sulfur or alkali-sulfur compounds of 1:10 to 1:1. A ratio of more than 1:10 will in general not be chosen because of the decline of the energy density, beyond this value. On the other hand, the ratio could fall between 1:1 in the case of certain particularly favorable solvents.

The cathode chamber will be filled with sulfur or sulfides or a mixture of sulfur and sulfides. During the operation of the cell the sulfur and the sulfides react with the alkali metal with the result that there is generally a mixture of sulfur, monosulfide and polysulfides in the cathode chamber. The substances commonly found in the cathode chamber are $Na_2S$, $Na_2S_2$, $Na_2S_4$, $Na_2S_5$ and S.

Solvents which exhibit about equivalent dissolving power for the different alkali-rich polysulfides may be employed. A mixture of solvents suitable for dissolving $Na_2S$, $Na_2S_2$, $Na_2S_5$ and S can also be used.

With the basically highly desirable lowering of the operating temperature, there is a slowing-down of the electrochemical reaction and an increase of the internal resistance of the solid electrolyte. In order to compensate for this drawback, it is advisable to design the solid electrolyte and the cells in such a manner that the boundary or reaction area is increased substantially, preferably 3 to 10 times, over known designs. In one specific embodiment of the invention, this can be accomplished by making the solid electrolyte in cylindrical form or a square block of beta-$Al_2O_3$ with numerous parallel canals, the canals being filled alternatingly with alkali metal and sulfur or polysulfide, respectively.

A better utilization of the volume in the direction indicated above can be achieved if the shaped solid electrolyte body is not made cylindrical but with a square or hexagonal cross section. In this manner, there can be produced cells having rather high power density with a maximum of capillary reaction area.

Other features which are considered as characteristic for the invention are set forth in the appended claims.

Although the invention is illustrated and described herein as embodied in electrochemical storage cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 a side elevation of a tubular cell;

Figure 1:
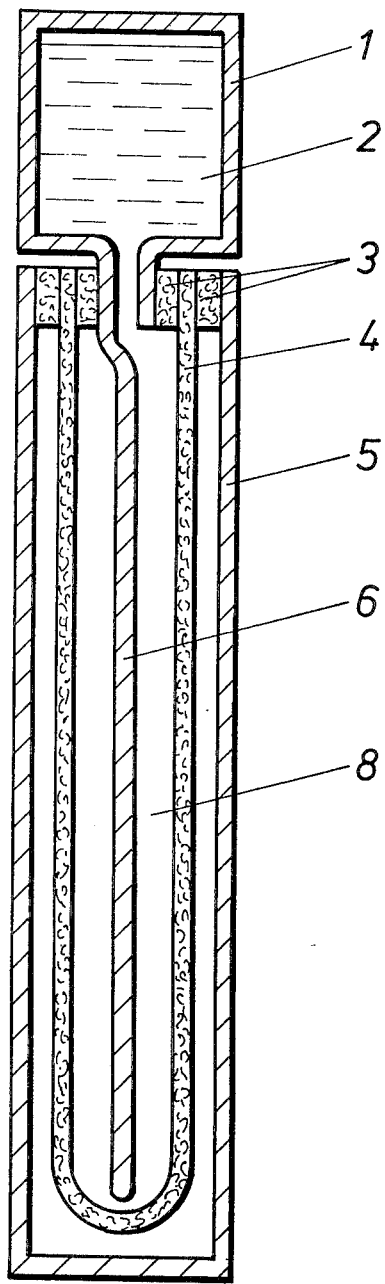

Referring to FIG. 1, the tubular cell contains a steel wall 1, which shields the Na reservoir 2 against the atmosphere. By means of $\alpha$-$Al_2O_3$ rings 3, which are joined to the adjacent parts by glass solder, the transition, on the one hand, between the $\beta$-$Al_2O_3$ ceramic part 4 and the steel wall 1 and, on the other hand, that between the $\beta$-$Al_2O_3$ ceramic part 4 and the steel housing 5 can be realized. A steel current collector 6 is immersed in the liquid sodium 8, which is present in excess. The wall thickness of the ceramic tube 4 of $\beta$-$Al_2O_3$ is 1.5 mm. The gap width between the latter and the steel housing 5 is 2.25 mm. In the actually performed test, there was 250 mg of graphite felt as the cathode material between the $\beta$-$Al_2O_3$ ceramic part 4 and the steel housing 5. The reaction substance and solvent, which were composed in the present case of 6 g $Na_2S_4$ and 3 g ethylene glycol, were contained in the cathode chamber, which is bounded by steel housing 5 and ceramic part 4.

Figure 2:
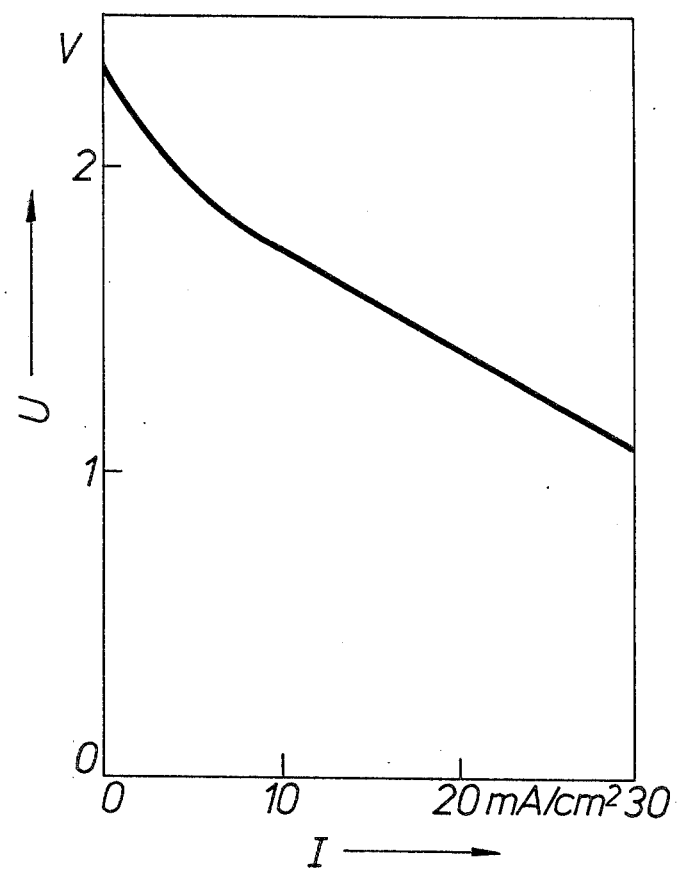
FIG. 2 is a graph showing a current-voltage characteristic obtained with a tubular cell of FIG. 1.

The U/I characteristic shown in FIG. 2 were measured with the cell arrangement according to FIG. 1 and the test conditions described above. With a cell voltage of about 1.1 V, i.e., in the neighborhood of the power maximum, a current density of at least 30 mA/cm$^2$ or a power density of at least 33 mW/cm$^2$ is obtained. The latter is lower by a factor of 2 to 3 than with the conventional Na/S cells, which operate without the addition of a solvent at 300° C. Under special conditions, however, higher values can be obtained, e.g., 50 mA/cm$^2$ using glycerin as the solvent. If it is desired to compensate, cell design may be used in which the reaction area referred to the unit of volume is increased.

Figure 3:
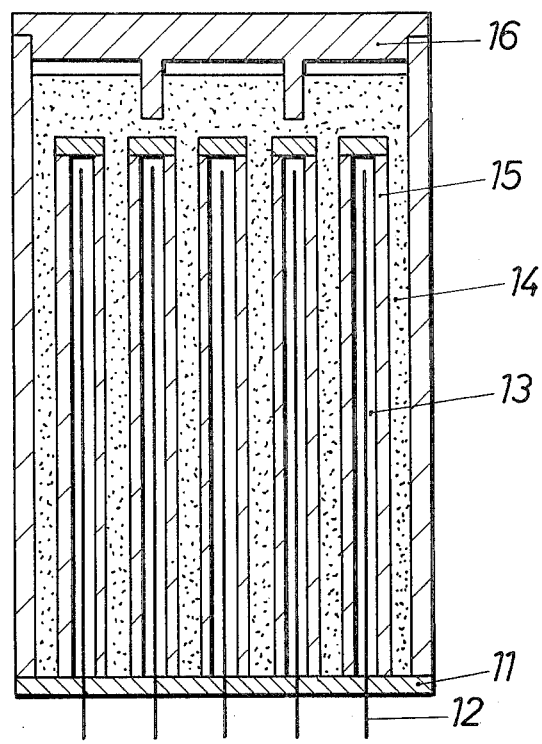
FIG. 3 shows a side elevation of a cell block, in which a multiplicity of small individual cells is contained as parallel canals.
Figure 4:
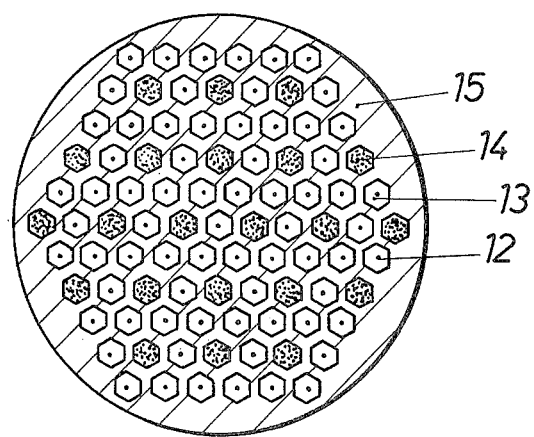
FIG. 4 shows a cross section through the cell of FIG. 3.

In FIG. 3, such a cell is shown in a side elevation and in FIG. 4, in cross section. The cathodic current collectors 12 are brought out through the $\alpha$-$Al_2O_3$ closure plate 11 by means of holes. In the canal 13, there is solid and dissolved $Na_2S_x$ and graphite felt. Adjacent to the latter, the liquid sodium 14 is localized, separated by a $\beta$-$Al_2O_3$ block 15. Above the sodium reservoir there are the anodic current collectors 16.

Figure 5:
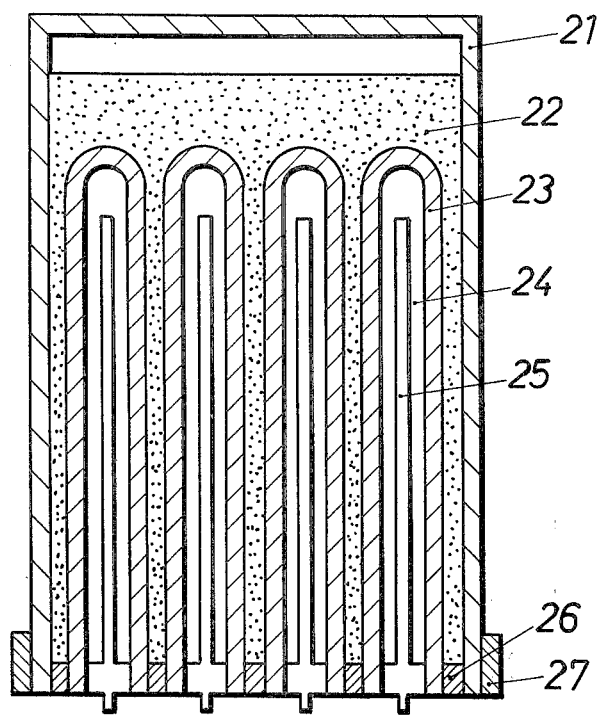
FIG. 5 shows in side elevation another embodiment of a cell, in which several tubular solid electrolytes are structurally combined.

FIG. 5 exemplifies another cell type, in which likewise a large reaction area is realized per unit volume. An Al housing 21 serves as the anodic current collector and contains essentially the liquid sodium 22. The $\beta$-$Al_2O_3$ tubes 23 in the liquid sodium 22 are immersed. Tubes 23 contain solid and dissolved $Na_2S_x$ and graphite felt 24. The cathodic current collectors 25 are brought out through an $\alpha$-$Al_2O_3$ closing plate 26. A pressure ring 27 is placed over the cell housing.

For a 100-Wh cell based on $Na/Na_2S_x$, wherein the polysulfide is present, according to the invention, in dissolved form, it is found that a volume of 249 cm³ is required with a design according to FIG. 3 and of 229 cm³ with a design according to FIG. 5. In the first case the total weight is 623 g and in the second case 738 g. If a power density of 100 W/kg is desired in such cells, the required current density would be 25 to 70 mA/cm² or only 20 to 40 mA/cm², respectively, for the cell types considered, or only 20 to 40 mA/cm², respectively, for the cell types considered.

There are claimed:

1. In an electrochemical storage cell or battery based on alkali metal and sulfur with at least one anode chamber containing alkali metal and one cathode chamber containing alkali sulfide compounds which are separated from each other by an ion-conducting solid electrolyte, the improvement comprising at least partially dissolved alkali sulfide compounds in the cathode chamber, in an organic liquid solvent with a boiling point above the operating temperature of the electrochemical storage cell, said operating temperature of the cell being in the range of about 100° to 200° C.

2. Storage cell according to claim 1, wherein said solvent is composed of a mixture of solvents.

3. Storage cell according to claim 1, wherein said solvent is a non-proton donor solvent.

4. Storage cell according to claim 1, wherein said solvent is an alcohol containing more than one hydroxyl group.

5. Storage cell according to claim 1, wherein said solvent is a thio alcohol having more than one SH group.

6. Storage cell according to claim 1, wherein said solvent is glycerin.

7. Storage cell according to claim 1, wherein said solvent is ethylene glycol.

8. Storage cell according to claim 1 wherein the weight ratio of solvent to the alkali sulfide compounds is within the range of 1:10 to 1:1.

9. Storage cell according to claim 1, wherein an amount of solvent is added to the alkali sulfide compounds in the cathode chamber so that up to 75% by weight of the alkali sulfide compounds present in the cathode chamber are in the undissolved state.

10. Storage cell according to claim 1, wherein said solvent is a mixture of miscible solvents contained in the cathode chamber for dissolving $Na_2S$, $Na_2S_2$, $Na_2S_5$ and S.

11. Storage cell according to claim 1, wherein the solid electrolyte is in the form of a cylindrical block of beta-$Al_2O_3$ with numerous parallel canals, with the canals alternatingly containing alkali metal and alkali sulfide compounds.

12. Storage cell according to claim 1, wherein graphite felt is also contained in the cathode chamber.

* * * * *